Figure 1:
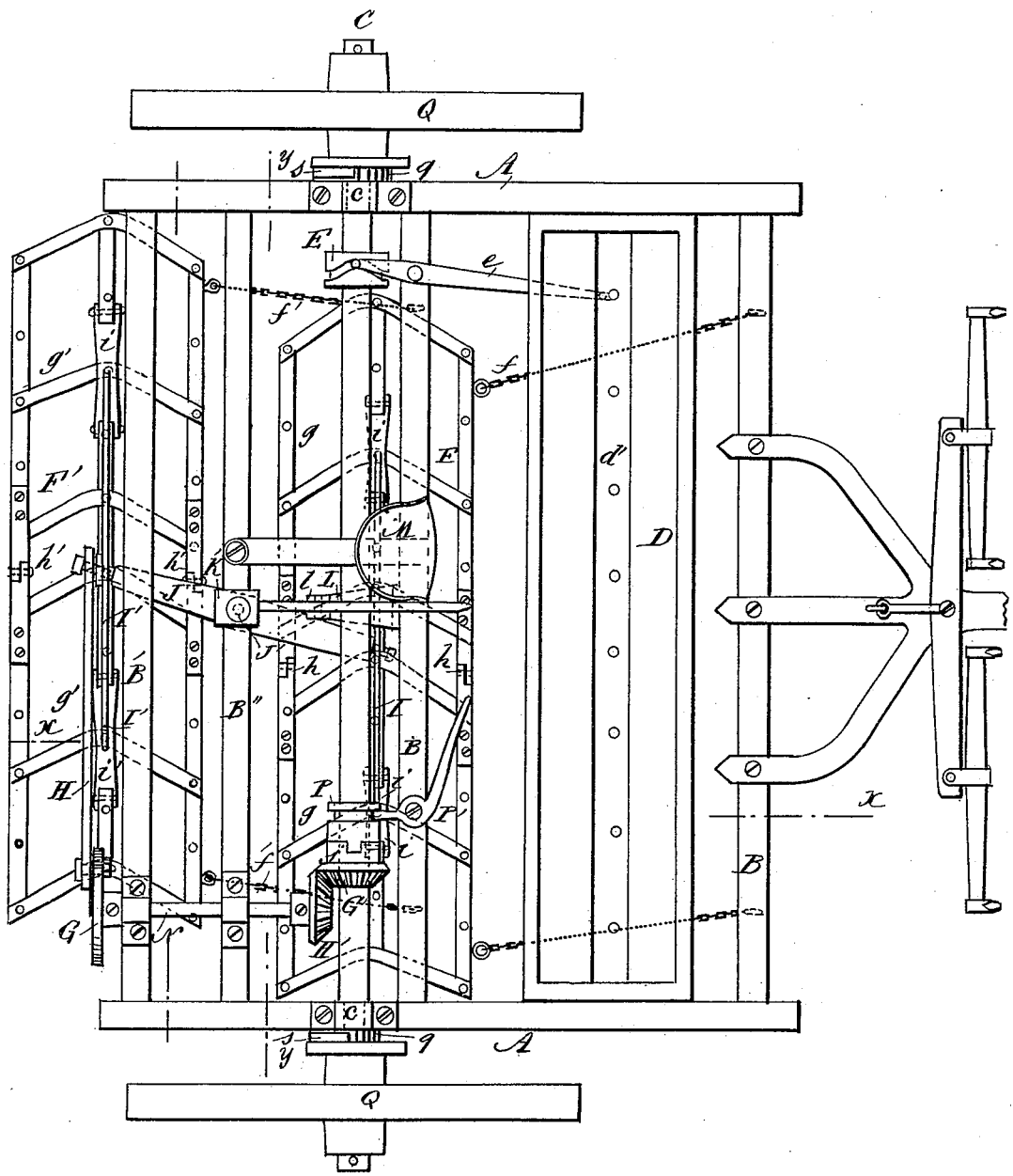

(No Model.) 2 Sheets—Sheet 1.

A. C. SCARR.
SULKY HARROW AND SEED SOWER COMBINED.

No. 252,806. Patented Jan. 24, 1882.

WITNESSES:
C. Neveux
C. Sedgwick

INVENTOR:
A. C. Scarr
BY Munn & Co
ATTORNEYS.

(No Model.) 2 Sheets—Sheet 2.
A. C. SCARR.
SULKY HARROW AND SEED SOWER COMBINED.
No. 252,806. Patented Jan. 24, 1882.
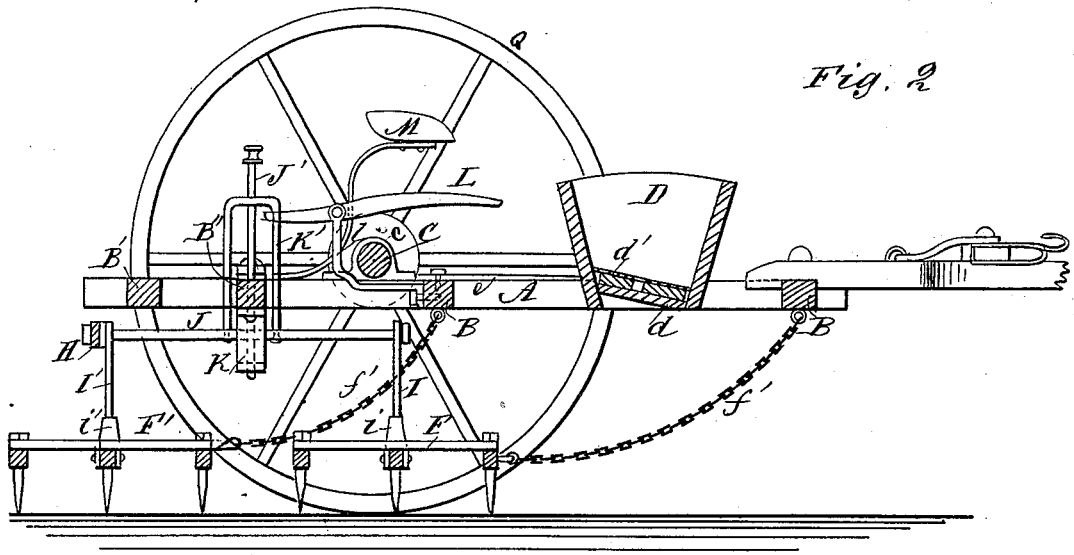
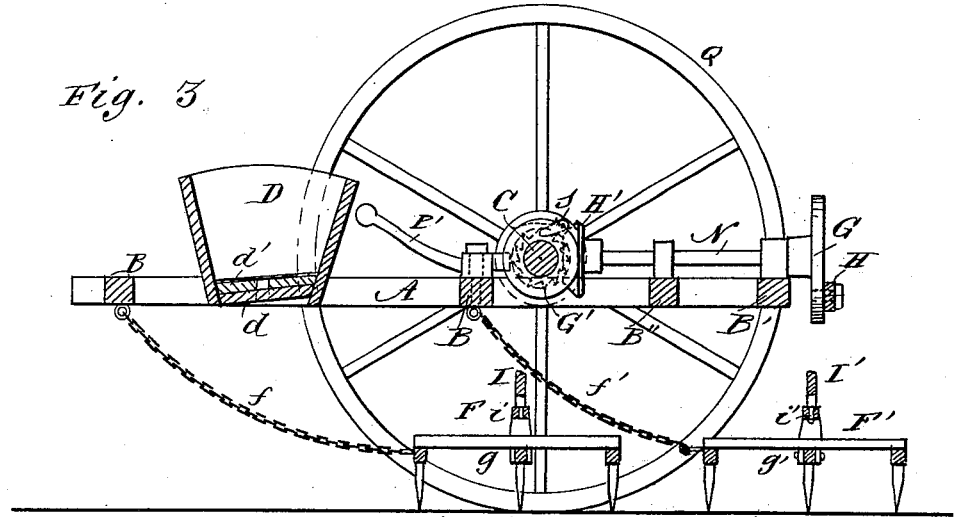
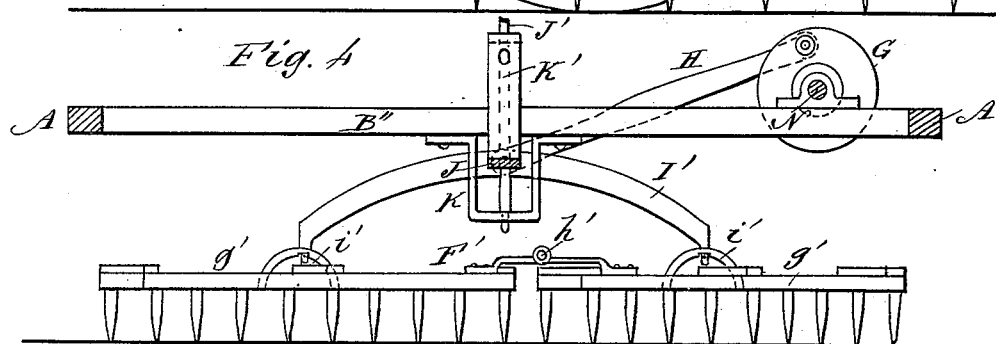
WITNESSES:
C. Neveux
C. Sedgwick
INVENTOR:
A. C. Scarr
BY Munn & Co.
ATTORNEYS.

UNITED STATES PATENT OFFICE.

ABRAHAM C. SCARR, OF MARYBOROUGH TOWNSHIP, ONTARIO, CANADA.

SULKY-HARROW AND SEED-SOWER COMBINED.

SPECIFICATION forming part of Letters Patent No. 252,806, dated January 24, 1882.

Application filed September 30, 1881. (No model.)

*To all whom it may concern:*

Be it known that I, ABRAHAM C. SCARR, of Maryborough township, Ontario, Canada, have invented a new and Improved Sulky-Harrow and Seed-Sower Combined, of which the following is a full, clear, and exact description.

The object of my invention is to provide a harrow having such action that its teeth will not have a tendency to follow the edges of the furrows nor leave narrow unbroken ridges in the soil, but will cut the soil in all directions, causing complete pulverization of the soil and perfect covering of the seed without the necessity of cross-harrowing the field; and also to provide a harrow which cannot be easily clogged with sods or similar things, and in that manner prevented from free and perfect action and rendered hard of draft, as is the case with harrows of ordinary construction.

My invention consists in the construction, arrangement, and combination of the parts, as hereinafter more fully described.

In the accompanying drawings, Figure 1 is a plan view of my invention. Fig. 2 is a cross-section of the same, taken on the line $x\ x$ of Fig. 1. Fig. 3 is the same section as that of Fig. 2, but looking in the opposite direction; and Fig. 4 is a longitudinal section taken on the line $y\ y$ of Fig. 1.

Similar letters of reference indicate corresponding parts.

The frame of my improved machine is composed of the side bars, A A, and the cross-bars B B, which latter are forward of the axle C of the sulky, and the cross-bars B' B'', which are in rear of the axle. The frame is secured upon the axle C by the bearings $c\ c$, bolted upon the side bars, A A.

In front of the axle and between the cross-bars B B is secured upon the side bars, A A, the seed-box D, which is provided with the perforated false bottom $d'$, which is moved over the perforated main bottom $d$ of the box, preferably by means of the cam E, secured upon the shaft, which cam operates the connecting-bar $e$, pivoted upon the cross-bar B, and connected at its forward end to the false bottom, as shown.

To the under side of the cross bars B B are connected by means of the chains $f f$ and $f' f'$ the drags or harrows F and F', which harrows are formed of the sections $g\ g$ and $g'\ g'$, which sections are jointed together by the hinged joints $h\ h$ and $h'\ h'$.

Upon the center bar of each of the sections of the harrow are secured the semicircular bows $i\ i$ and $i'\ i'$, to which are connected the ends of the yokes I I', which yokes are attached at their centers to the oscillating bar J, which is pivoted on the vertical rod J', which takes its bearings in the cross-bar B'' and in the loop K, bolted to the under side of the bar B'', as shown clearly in Figs. 2 and 4. The rod J' extends some distance above the cross-bar B'', as clearly shown in Fig. 2, and serves also to guide the vertical movement of the loop or yoke K', which is placed upon it, as shown. This loop K', when in place, straddles the cross-bar B'', and its lower ends are riveted or otherwise secured to the oscillating bar J, and the hand-lever L is swiveled in any suitable manner to this loop. This hand-lever is pivoted in the bracket $l$, secured upon the cross-bar B in convenient reach of the driver, and by means of it the harrows may be raised out of contact with the ground for passing over obstacles or for moving the harrow to or from the field or from one field to another.

To the rear end of the oscillating bar J is attached one end of the pitman-rod H, the other end of which is connected to the crank-wheel G, secured upon the rear end of the shaft N, which is journaled in bearings upon the cross-bars B' B''. The inner end of this shaft is provided with the beveled gear wheel H', which meshes with the beveled pinion G', placed loosely upon the axle C. This pinion G' is formed with the notched extension $j$, with which the projections of the sliding clutch-collar P are adapted to engage. The clutch-collar P is placed upon suitable feathers formed upon the shaft, and is adapted to be moved to engage and disengage the pinion H', for putting the machine in and out of gear by the foot-lever P', pivoted upon the cross-bar B, near the seat M, in convenient position for the driver.

In order that the harrow may be easily turned in either direction without cramping the axle, I provide the axle, near the bearings of the drive-wheels Q Q, with the fixed notches $q\ q$, and provide the hubs of the drive-wheels with the spring-actuated pawls $s\ s$, which engage with the notches and make the wheels fast upon the axle while going in a forward direction, but permit the wheels to turn backward upon the axle. The cam E is also loose upon the axle, and is adapted to be thrown in and out of action by means (which have been omitted from the drawings to avoid confusion) substantially the same as that just described for throwing in and out of action the oscillating mechanism.

When all parts of the machine are in operation the seed will be scattered evenly over the ground in front of the harrows, and the harrows will be given an alternate rapid and positive oscillating movement, which will cause the soil to be cut in all directions and thoroughly pulverized and the seed to be perfectly and sufficiently covered.

It will be observed that the harrow mechanism is entirely independent in its action of the seeding mechanism, and that the seeding mechanism might therefore be omitted, if desired; but I prefer in all instances to attach it, as it may be kept entirely out of action when desired.

I am aware that it is not broadly new to give harrows an oscillating movement, and I therefore do not claim such; but What I do claim, and desire to secure by Letters Patent, is—

1. The combination, with the frame and the harrows F F', of the yokes I I', the oscillating bar J, the vertical rod J', the loop or yoke K', and means for oscillating said bar, substantially as and for the purpose set forth.

2. The harrows F F', formed of the sections $g\ g$ and $g'\ g'$, provided with the bows $i\ i$ and $i'\ i'$, in combination with the yokes I I', pivoted bar J, and means for oscillating said bar upon its pivot, substantially as and for the purpose set forth.

3. The combination, with the frame and the harrows F F', formed of the sections $g\ g\ g'\ g'$, and provided with the bows $i\ i'$, of the yokes I I', the pivoted bar J, the connecting-rod H, crank-wheel G, shaft N, and the pinions H' G', substantially as and for the purpose set forth.

4. The combination, with the frame, the harrows F F', and the yokes I I', of the pivoted bar J, the vertical rod J', the loop or yoke K', and the lever L, substantially as and for the purpose set forth.

ABRAHAM C. SCARR.

Witnesses:
J. FRANCIS C. HALDAN,
H. J. POWLEY.